United States Patent
Qian et al.

(10) Patent No.: US 9,602,525 B2
(45) Date of Patent: Mar. 21, 2017

(54) CLASSIFICATION OF MALWARE GENERATED DOMAIN NAMES

(71) Applicant: Cisco Technology, Inc., San Jose, CA (US)

(72) Inventors: Jiang Qian, San Diego, CA (US); Adam J. O'Donnell, San Francisco, CA (US); Paul Frank, Columbia, MD (US); Patrick Mullen, Columbia, MD (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/633,805

(22) Filed: Feb. 27, 2015

(65) Prior Publication Data

US 2016/0255107 A1    Sep. 1, 2016

(51) Int. Cl.
*G06F 12/14* (2006.01)
*H04L 29/06* (2006.01)

(52) U.S. Cl.
CPC ...... *H04L 63/1425* (2013.01); *H04L 63/1433* (2013.01); *H04L 63/1466* (2013.01)

(58) Field of Classification Search
None
See application file for complete search history.

(56) References Cited

U.S. PATENT DOCUMENTS

| | | |
|---|---|---|
| 7,305,708 B2 | 12/2007 | Norton et al. |
| 7,313,695 B2 | 12/2007 | Norton et al. |
| 7,317,693 B1 | 1/2008 | Roesch et al. |
| 7,496,662 B1 | 2/2009 | Roesch et al. |
| 7,539,681 B2 | 5/2009 | Norton et al. |

(Continued)

FOREIGN PATENT DOCUMENTS

| | | |
|---|---|---|
| CA | 2685292 A1 | 11/2008 |
| JP | 2013-528852 A | 7/2013 |

(Continued)

OTHER PUBLICATIONS

M. Thomas and A. Mohaisen. Kindred domains: detecting and clustering botnet domains using DNS traffic. WWW Companion '14. Apr. 2014. 6 pages.

(Continued)

*Primary Examiner* — Brandon Hoffman
(74) *Attorney, Agent, or Firm* — Edell, Shapiro & Finnan, LLC

(57) ABSTRACT

Techniques are presented herein that combine a host-based analysis of an executable file on a host computer with a network-based analysis, i.e., an analysis of domain names to detect malware generated domain names that are used by the malicious executable files to establish malicious network connections. A server receives information from a host computer about an executable file that, when executed on the host computer, initiates a network connection. The server also receives information about the network connection itself. The server analyzes the information about the executable file to determine whether the executable file has a malicious disposition. Depending on a disposition of the executable file, the server analyzes the information about the network connection and determines whether the network connection is malicious.

18 Claims, 8 Drawing Sheets

(56) References Cited

U.S. PATENT DOCUMENTS

| | | | |
|---|---|---|---|
| 7,756,885 | B2 | 7/2010 | Norton et al. |
| 7,801,980 | B1 | 9/2010 | Roesch et al. |
| 7,885,190 | B1 | 2/2011 | Roesch et al. |
| 7,949,732 | B1 | 5/2011 | Roesch et al. |
| 7,996,424 | B2 | 8/2011 | Norton et al. |
| 8,046,833 | B2 | 10/2011 | Gustafson et al. |
| 8,127,353 | B2 | 2/2012 | Rittermann |
| 8,516,585 | B2 | 8/2013 | Cao et al. |
| 8,578,002 | B1 | 11/2013 | Roesch et al. |
| 8,601,034 | B2 | 12/2013 | Roesch |
| 8,631,489 | B2 | 1/2014 | Antonakakis et al. |
| 8,631,498 | B1 | 1/2014 | Hart et al. |
| 8,661,544 | B2 | 2/2014 | Yen et al. |
| 8,677,486 | B2 | 3/2014 | Olney et al. |
| 8,683,052 | B1 * | 3/2014 | Brinskelle ........... H04L 63/0823 709/228 |
| 9,100,425 | B2 | 8/2015 | Friedrichs et al. |
| 9,135,432 | B2 | 9/2015 | Roesch |
| 2012/0102545 | A1 * | 4/2012 | Carter, III ......... G06F 17/30864 726/3 |
| 2013/0191915 | A1 | 7/2013 | Antonakakis et al. |
| 2014/0075558 | A1 | 3/2014 | Ward et al. |
| 2014/0298460 | A1 * | 10/2014 | Xue ................... H04L 63/1483 726/23 |
| 2015/0341378 | A1 | 11/2015 | Roesch | |

FOREIGN PATENT DOCUMENTS

| | | |
|---|---|---|
| JP | 2014-510484 A | 4/2014 |
| WO | 2006/020290 A2 | 2/2006 |
| WO | 2007/058952 A2 | 5/2007 |
| WO | 2008/134057 A1 | 11/2008 |
| WO | 2011/130510 A1 | 10/2011 |
| WO | 2012/125221 A1 | 9/2012 |

OTHER PUBLICATIONS

Detecting Algorithmically Generated Domain-Flux Attacks With DNS Traffic Analysis, by Yadav, S., et al. http:flconferences.sigcomm.org/imc/2010/papers/p48.pdf, 15 pages, 2012.

H. Guerid, K. Mittig, et al. Privacy-Preserving Domain-Flux Botnet Detection in a Large Scale Network. COMSNETS 2013. Jan. 2013, 9 pages.

Columbo, E. Cerberus: Detection and characterization of automatically generated malicious domains. Thesis. Apr. 2014, 134 pages.

Yadav, et al., "Detecting Algorithmically Generated Malicious Domain Names," IMC'10, Nov. 1-3, 2010, pp. 48-61.

Schiavoni, et al., "Tracking and Characterizing Botnets Using Automatically Generated Domains," Nov. 2013, retrieved from http://arxiv.org/abs/1311.5612, on Feb. 27, 2015, 14 pages.

Raghuram, et al., "Unsupervised, low latency anomaly detection of algorithmically generated domain names by generative probabilistic modeling," Journal of Advanced Research (2014) 5, Jan. 2014, pp. 423-433.

Antonakakis, et al., "From Throw-Away Traffic to Bots: Detecting the Rise of DGA-Based Malware," USENIX Security Symposium 2012, Aug. 2012, 16 pages.

Weymes, "DNS anomaly detection: Defend against sophisticated malware," May 28, 2013, retrieved from http://www.net-security.org/article.php?id=1844&p=1, on Feb. 27, 2015, 3 pages.

* cited by examiner

CLASSIFICATION OF MALWARE GENERATED DOMAIN NAMES

TECHNICAL FIELD

The present disclosure relates to network security.

BACKGROUND

Malicious botnets are one of the most potent threats to networking systems. Networked computers may become bots, i.e., entities of malicious botnets, and may provide a platform for performing malicious activities such as denial-of-service (DoS) attacks, information gathering, distributed computing, cyber fraud, malware distribution, unsolicited marketing, etc.

Botnets infect networking systems through a complex sequence of steps including malware propagation, call-back (rallying) and command-and-control (C&C) operations. Once a botnet is established, a botnet's originator (or "bot master") can control the botnet entities (bots) remotely via a C&C server.

DESCRIPTION OF EXAMPLE EMBODIMENTS

Overview

Techniques are presented herein that combine a host-based analysis of an executable file on a host computer with a network-based analysis, in order to detect malware generated domain names that are used by malicious executable files to establish malicious network connections. Information is received from a host computer about an executable file that, when executed on the host computer, initiates a network connection. Information is also received about the network connection itself. The information about the executable file is analyzed to determine whether the executable file has a malicious disposition. Depending on a disposition of the executable file, the information about the network connection is analyzed to determine whether the network connection is malicious.

Example Embodiments

During early steps in a botnet infection sequence, an infected host computer establishes communication with a C&C server that is controlled by a bot master. Some malicious botnets use common protocols such as Hypertext Transfer Protocol (HTTP) and Domain Name System (DNS) to connect with the C&C server. In addition, some botnets utilize Domain Name Generation Algorithms (DGAs) to dynamically generate a set of random domain names that serve as rendezvous points. These random domain names can be detected and classified. Based on the classification of the domain names, established botnets can be detected within a network and/or measures can be taken to prevent botnets from being formed.

Figure 1:
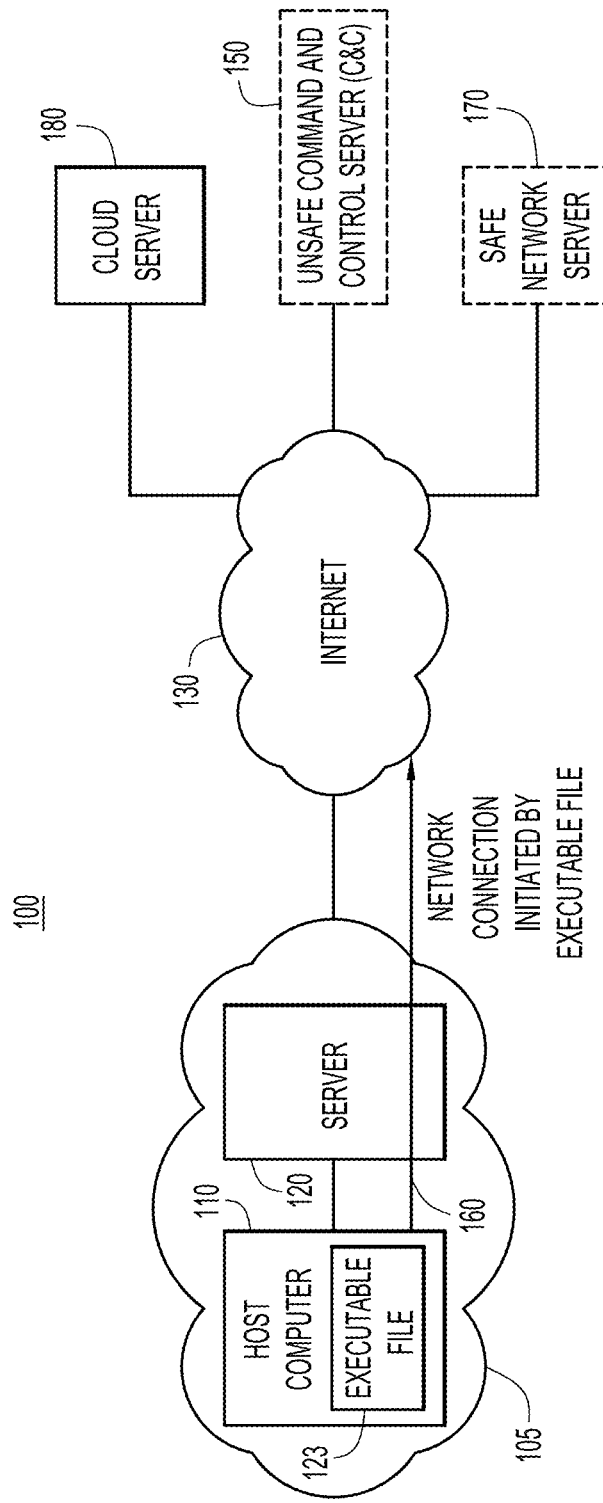
FIG. 1 is a block diagram illustrating a networking system in which the malware classification methods presented herein may be employed, according to an example embodiment.

FIG. 1 is a block diagram illustrating a networking system 100 in which the techniques presented herein may be employed. As described below in detail, these techniques improve the results of detecting botnets or attempts to establish botnets by detecting malware generated domain names. Networking system 100 includes a host computer 110 and a server 120. Host computer 110 is connected to the Internet 130 via server 120 or may connect directly to the Internet 130. Host computer 110 and server 120 may be network entities of an enterprise network 105 and server 120 may be set up to operate as a firewall. In FIG. 1, for simplicity, only host computer 110 and server 120 are shown as part of enterprise network 105. However, the enterprise network 105 may include, but is not limited to, a plurality of host computers, servers and other network devices. Also, FIG. 1 shows that a host computer 110 attempts to make a network connection 160 that is initiated by an executable file 123. In addition, several network elements may be connected to Internet 130 that are outside enterprise network 105, such as an unsafe C&C server 150, safe network server 170 and cloud server 180. Cloud server 180 stores whitelists and blacklists and can be accessed via Internet 130 by server 120 when information about the executable file 123 and about the network connection 160 is analyzed, as discussed in further detail below. As used herein, an "executable file" is a file that causes a computer/processor to execute instructions, and the file may be in a machine language, interpreted language, intermediate language, script language or any other language now known or hereinafter developed that causes a computer/processor to execute instructions.

A whitelist is a listing (e.g., a database) of information describing files that are known to be safe. A blacklist is a listing (e.g., a database) of information describing files that are known to be malicious. A file is considered to be "safe" if it is contained in a whitelist. A file is considered to be "malicious" if it is contained in a blacklist. A file is said have a malicious disposition if it is not contained in a whitelist and there are other reasons to suspect that the file is malicious. A file is said to be "unknown" if it is not in a whitelist or in a blacklist, such it cannot be said whether the file is malicious or not malicious.

FIG. 1 shows C&C server 150 is connected to the Internet 130. The C&C controller 150 is controlled by a botnet originator, also known as "bot herder" or "bot master." The botnet originator uses C&C server 150 to remotely control host computers, such as host computer 110. Since most enterprise networks are configured to allow outbound Hypertext Transfer Protocol (HTTP) requests, when host computer 110 is infected, executable file 123, may be modified to use common protocols such as DNS and HTTP to evade firewall rules that may be implemented on server 120. In particular, as part of the infection sequence, in order to establish external network connection 160 to C&C server 150, infected host computer 110 may need to determine an exact domain name to which it can connect. This can be achieved, as discussed in further detail below, by dynamically computing a list of "random" domain names and by trying to establish connections with each of the domains represented by the random domain names, hoping that one or more of these random domains have been pre-registered by the botnet originator. It is to be noted that these dynamically computed domain names are not random per se, but they appear random though they are predictable. Ostensibly the domains will only be known to the malware authors/creators. If infected host computer 110 is able to establish a call back connection with C&C server 150 via at least one of the random domain names, then host computer 110 becomes an active part of the botnet and receives further updates or instructions.

Figure 2:
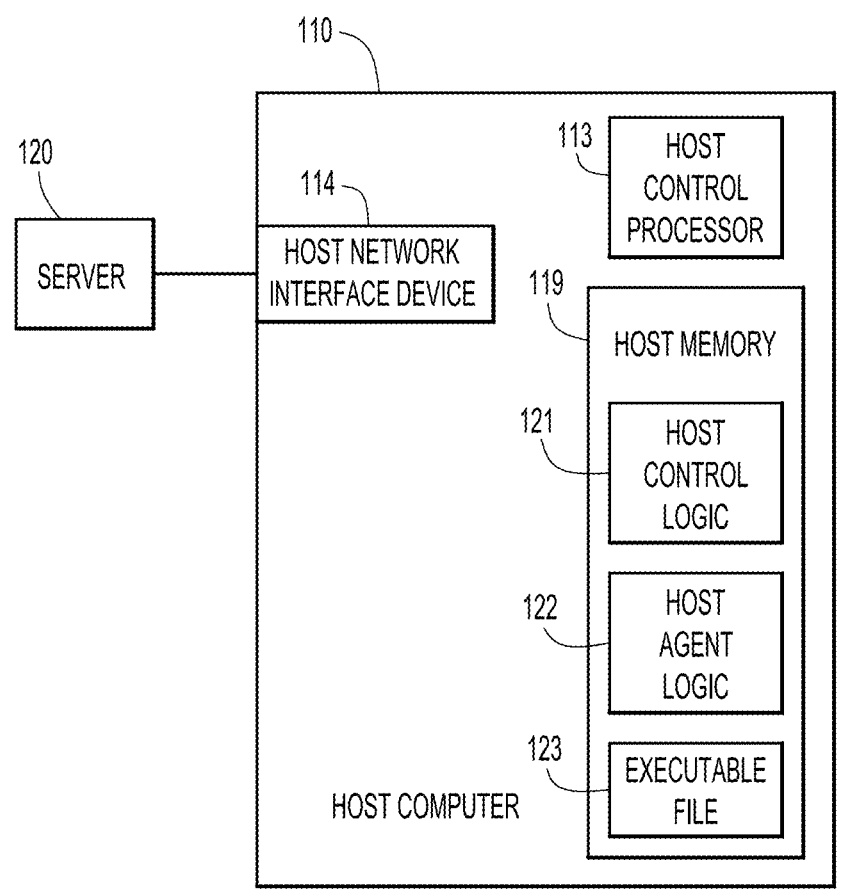
FIG. 2 is a block diagram illustrating a configuration of a host computer configured to participate in the malware classification methods, according to an example embodiment.

Reference is now made to FIG. 2. FIG. 2 is a block diagram of host computer 110 in FIG. 1. Host computer 110 includes host control processor 113, host network interface device 114, and host memory 119. Host computer 110 is connected to server 120 via host network interface device 114. Host memory 119 stores host control logic 121, host agent logic 122, and executable file 123. Host control logic 121 is software that enables host computer 110 to connect to server 120 and, via server 120, to the Internet 130, as shown in FIG. 1. Host agent logic 122 is software that enables host computer 110 to monitor file related activities on host computer 110 and to send queries to server 120 for file disposition information. Host control processor 113 is, for example, a microprocessor or a microcontroller that executes instructions for host control logic 121, host agent logic 122, and executable file 123. When the software is executed by the host control processor 113, it is operable to perform the operations described herein in connection with host control logic 121, host agent logic 122, and executable file 123.

Executable file 123 may be any type of software that enables host computer 110 to execute any type of application. Although executable file 123 is shown in FIG. 2 as a separate entity, executable file 123 may also be part of host control logic 121. In particular, executable file 123 may, when executed by host control processor 113, initiate the network connection 160 shown in FIG. 1.

It is possible that executable file 123 may be infected by botnet malware, and could spawn or lead to malware propagation. Malware propagation may be accomplished in many ways, for example through external scan of vulnerable machines, drive-by download, use of infected media, and social engineering, i.e., by methods of intrusion that rely on human interaction and involve tricking people into breaking normal security procedures. It is assumed that an infection has already occurred before it is determined whether an attempt to establish the network connection 160 by the executed executable file is malicious according to the techniques described in connection with FIGS. 2-8. If executable file 123 is infected by botnet malware that uses a DGA to initiate network connection 160, host computer 110 may become a DGA bot, i.e., an infected network computer that uses a dynamically generated set of random domain names to connect to a botnet server through which the botnet is controlled.

Figure 3:
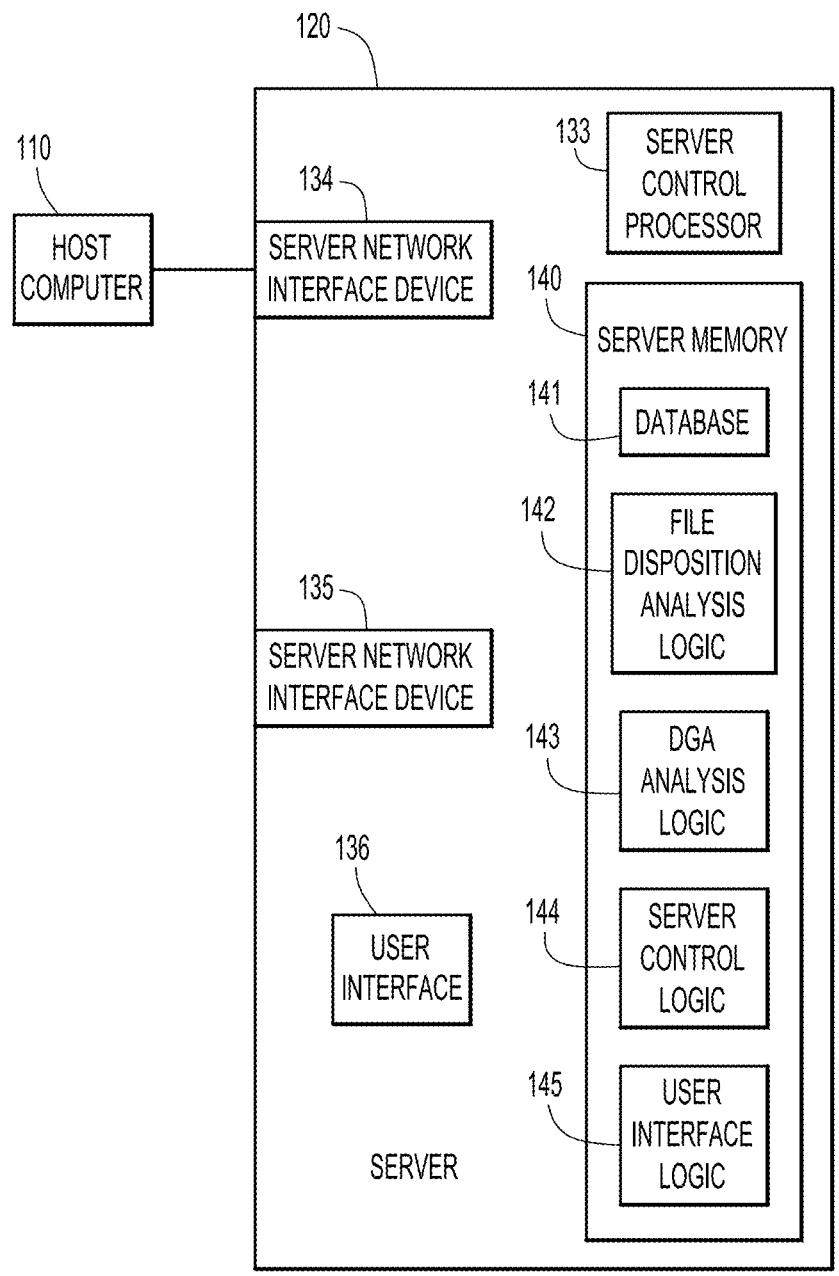
FIG. 3 is a block diagram illustrating a configuration of a server configured to participate in the malware classification methods, according to an example embodiment.

Reference is now made to FIG. 3. FIG. 3 is a block diagram of server 120 in FIG. 1. Server 120 may be, e.g., a firewall of an enterprise network. Server 120 includes server control processor 133, server network interface device 134, server network interface device 135, user interface 136, and server memory 140. The server network interface device 134 and server network interface device 135 may be the same device. Server 120 connects with host computer 110 via network interface device 134. Server memory 140 stores database 141, file disposition analysis logic 142, DGA analysis logic 143, server control logic 144, and user interface logic 145. File disposition analysis logic 142 is software that enables server 120 to generate file disposition information based on matches against known malware binaries and to monitor external network connections, such as network connection 160, to and from host computer 110. DGA analysis logic 143 is software that enables server 120 to classify network traffic that includes a domain name, including, without limitation, traffic associated with a uniform resource locator (URL), DNS requests, etc. Server control logic 144 is software that enables server 120 to connect to host computer 110 via server network interface device 134, and to the Internet 130 via server network interface device 135. Database 141 stores accumulated transaction information about file related activities of executable files, such as executable file 123, and results generated by file disposition analysis logic 142 and DGA analysis logic 143. User interface logic 145 is software that enables server 120 to present the results of the file disposition analysis and the DGA analysis to a user, such as an administrator of the enterprise network. The results may be used to take actions to prevent a botnet from being established, or to prevent an infected host computer (a bot) from being controlled by a botnet master.

Host memory 119 in FIG. 2 and server memory 140 in FIG. 3 may include read only memory (ROM), random access memory (RAM), magnetic disk storage media devices, optical storage media devices, flash memory devices, electrical, optical, or other physical/tangible memory storage devices. Server control processor 133 in FIG. 3 is, for example, a microprocessor or a microcontroller that executes instructions for file disposition analysis logic 142, DGA analysis logic 143, server control logic 144, and user interface logic 145.

Thus, in general, host memory 119 and server memory 140 may include one or more tangible (non-transitory) computer readable storage media (e.g., a memory device) encoded with software comprising computer executable instructions. When the software is executed by the server control processor 133, it is operable to perform the operations described herein in connection with file disposition analysis logic 142, DGA analysis logic 143, server control logic 144, and user interface logic 145.

Figure 4:
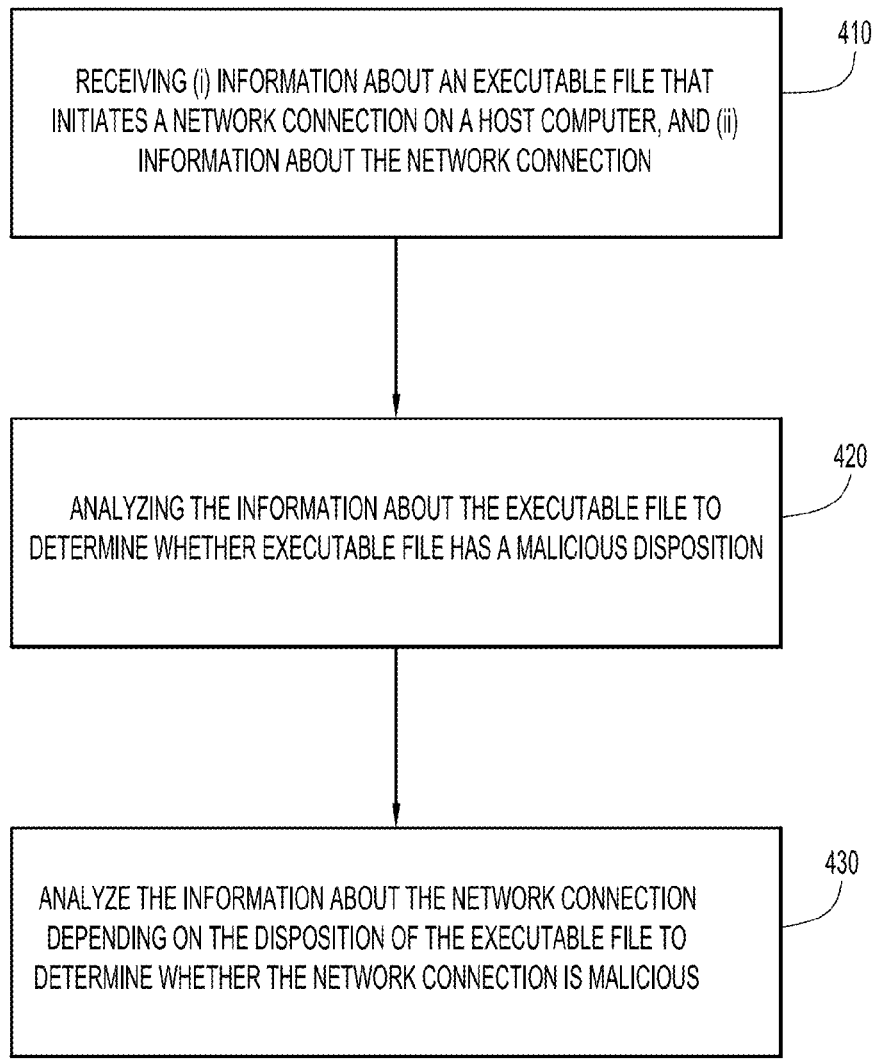
FIG. 4 is a flow chart depicting operations performed by the server according to an example embodiment.

Reference is now made to FIG. 4 (with continued reference to FIGS. 1-3) for description of method 400 of operations performed by server 120 pursuant to the techniques presented herein. Method 400 begins at 410, where server 120 receives information about executable file 123 that initiates a network connection (e.g., network connection 160) on host computer 110, and information about the network connection. The information about executable file 123 may be obtained from host agent logic 122 executed on host computer 110 which may intercept relevant file related system activities at a kernel or device driver level on host computer 110 and which may forward the information to the file disposition analysis logic 142 executed on server 120.

At 420, file disposition analysis logic 142 (shown in FIG. 3) analyzes the information about executable file 123 and determines whether executable file 123 has a malicious disposition, i.e., a tendency to be malicious. As described in further detail with regard to FIG. 5, the disposition of executable file 123 serves as an initial filter to reduce a rate of false positive results.

Figure 6:
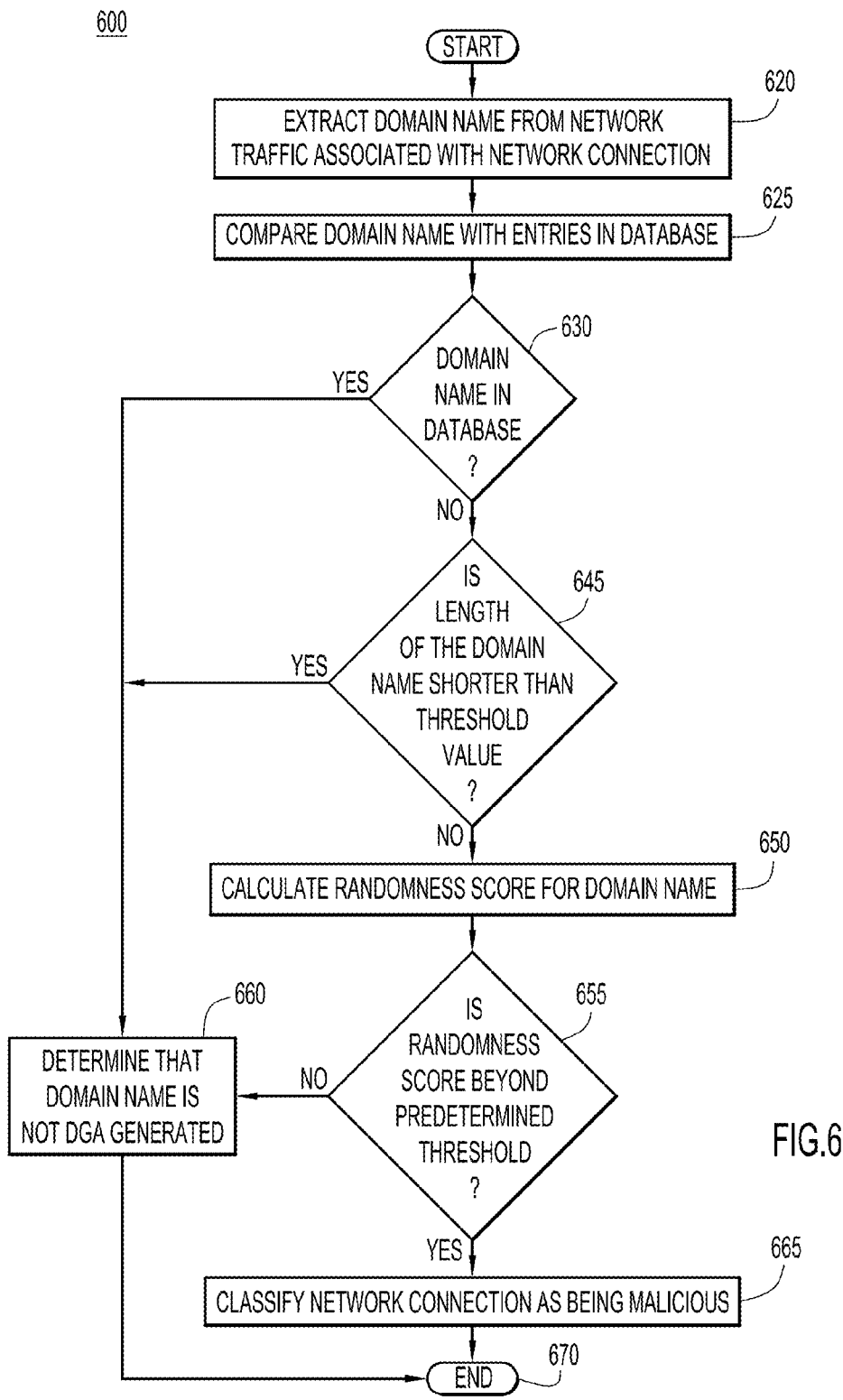
FIG. 6 is a flow chart depicting operations performed by the server to analyze information about a network connection according to an example embodiment.

At 430, depending on the disposition of executable file 123 to be malicious, and as further described in detail with regard to FIG. 6, the information about the network connection initiated by executable file 123 may be analyzed in order to determine whether the network connection is malicious. In particular, and as described further hereinafter, analysis is made of the information about the network connection initiated by the executable file if the executable file is classified as unknown. If the executable file has been classified as malicious, it is not necessary to analyze information about the network connection initiated by the executable file since the file has been flagged as malicious.

Figure 5:
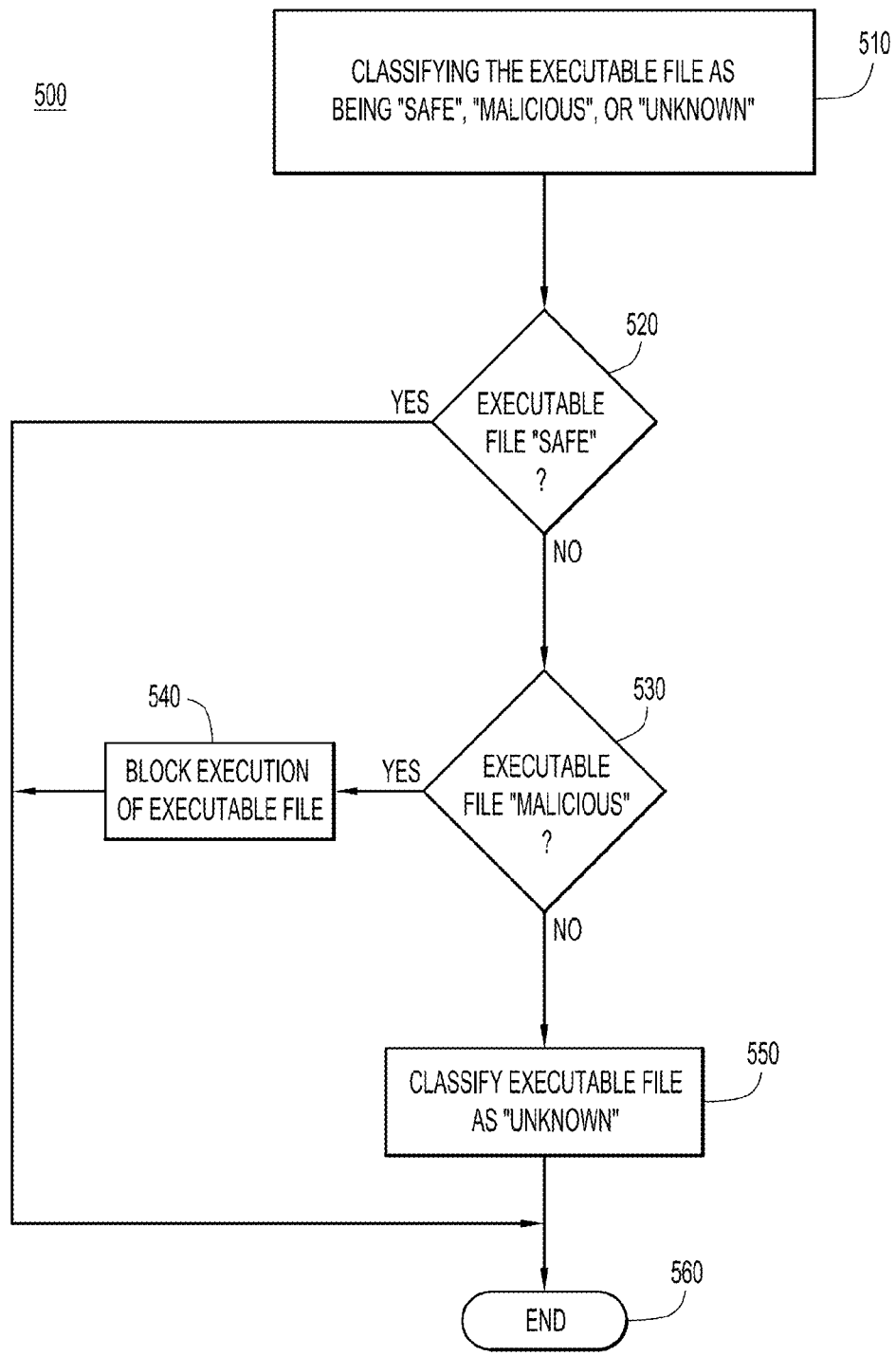
FIG. 5 is a flow chart depicting operations performed by the server to analyze information about an executable file according to an example embodiment.

Referring now to FIG. 5 (with continued reference to FIGS. 1-3), a flow chart is now described of method 500 for analyzing the information about executable file 123 to determine whether executable file 123 has a disposition to be malicious (420 in FIG. 4). The information about executable file 123 may include, but is not limited to including, a file name, a file size, and a hash value of executable file 123.

Method 500 begins at 510 where file disposition analysis logic 142 (shown in FIG. 3) classifies executable file 123 as being "safe," "malicious," or "unknown." Executable file 123 is classified by comparing the information about executable file 123 to whitelists and blacklists, i.e., to information about executable files stored in a whitelist database or in a blacklist database. For example, the hash value of executable file 123 that describes a content of executable file 123 may be compared with some known malicious executable content stored in the blacklist database to determine whether the executable file is "malicious." On the other hand, as discussed below, if the hash value of executable file 123 can be found in the whitelist database, executable file 123 can be determined to be "safe."

Whitelists and blacklists can be stored in database 141 in server memory 140 of server 120. In another example embodiment, whitelists and blacklists can also be stored on a cloud server, such as cloud server 180 depicted in FIG. 1 that is connected to the Internet 130 and that can be accessed by file disposition analysis logic 142 of server 120. Although cloud server 180 is shown in FIG. 1 as being outside enterprise network 105, it can also be part of enterprise network 105. Thus, host-based file information, i.e., information about executable file 123 collected by host agent logic 122 of host computer 110, is analyzed by file disposition analysis logic 142 on server 120 which compares the information with whitelists and blacklists that may be stored on cloud server 180.

At 520, executable file 123 is considered to be "safe" when information about executable file 123, e.g., the hash value executable file 123, is found in a whitelist stored on cloud server 180. Examples of executable files that are typically considered to be safe are known application programs such as Google Chrome™, Microsoft Internet Explorer, etc. When it is determined that executable file 123 is "safe," method 500 ends at 560. When information about executable file 123 is not found in the whitelist, method 500 continues to 530.

At 530, it is determined whether executable file 123 is "malicious," that is, whether it has a malicious disposition. An executable file is considered to be "malicious" when information about the executable file is found in a blacklist. When executable file 123 is classified as being "malicious," then at 540 executable file 123 is blocked from further execution and no further analysis is performed.

At 550, when information about executable file 123 is neither found in the whitelist, nor in the blacklist, executable file 123 is classified as being "unknown." Unknown executable files are common executables susceptible to exploits and executables not known to file disposition analysis logic 142 and therefore require further analysis. External connections initiated by "unknown" executable files are further analyzed and external connections initiated by "safe" executable files are excluded from further analysis. Executable files that are identified as being "safe" are identified as not being DGA bots, because these safe executable files connect to a safe network server, such as safe network server 170 in FIG. 1. Therefore, if network connection 160 is initiated by a "safe" executable file, it does not need to be further analyzed. Similarly, as discussed above, "malicious" executable files are blocked from further execution and are also not further analyzed. By excluding external connections initiated by "safe" executable files or by "malicious" executable files from further analysis, the amount of necessary processing power and a rate of false positive classifications of malicious network connections can be greatly reduced.

Referring now to FIG. 6, a flow chart of method 600 performed by DGA analysis logic 143 of server 120 is now described. Method 600 involves analyzing information about the network connection initiated by an executable file 123 that has been determined to be "unknown" such as according to the process shown at 550 in FIG. 5, in order to ultimately determine whether the network connection initiated by that executable file is malicious (430 in FIG. 4). FIGS. 1-3 are also referred to in the description of FIG. 6.

Method 600 begins at 620 at which a domain name is extracted from network traffic associated with network connection 160, e.g., a URL obtained by host agent logic 121 to be further analyzed by DGA analysis logic 143.

DGA generated domain names have a fairly distinct character distribution when compared with legitimate domain names through which safe network servers may be accessed. While most legitimate domains contain easily pronounceable syllables, DGA generated domain names tend to contain character sequences typically not found in natural language. Some examples for DGA generated domain names are: ajihkjhadve.com, nabytfyndve.com, acdbxybadve.com, nghavlandve.com, mdewptwmdve.com, kbcaveakdve.com, and hfgtiithdve.com. In other words, DGA generated domain names typically have a character distribution that deviates significantly from that of natural languages. For example, many DGAs result in domain names with an even character distribution, that is every character has a 1 in 26 chance of occurring. This is not the case for natural languages and therefore not the case in most legitimate domain names. Some malware authors will design their DGAs to choose from a subset of letters (or numbers) or try to weight their letter distribution similarly to the known distributions of a natural language in an attempt to bypass statistical analysis engines. The DGA detection algorithm presented herein has a better chance of catching these DGAs too because it evaluates the deviation from the natural language/safe domain name character distribution of all the n-gram's combined in order to flag a domain as possibly being a DGA generated domain name, as described in further detail below with regard to method 700 of FIG. 7.

At 625, to further reduce false positive results, the extracted domain name is compared with a whitelist of websites, e.g., with a database of websites that are known to be safe. Such a whitelist of websites may contain millions of websites and may also be stored in database 141 or in a database on cloud server 180. At 630, if the extracted domain name is found in the whitelist of websites, at 660 the domain name is classified as not being DGA generated and therefore, as not being malicious and the process ends at 670. Otherwise, the method 600 proceeds to 645.

At 645, DGA analysis logic 143 determines whether a length of the (primary registered) domain name is shorter than a predetermined threshold value. If it is determined that the length of the (primary registered) domain name is shorter than the predetermined threshold value, method 600 continues to 660 at which the domain name is classified as not being DGA generated. If DGA analysis logic 143 determines at 645 that the length of the (primary registered) domain name is not shorter, i.e., that it is longer than (beyond) the predetermined threshold value, at 650 a randomness score for the (primary registered) domain name is calculated by DGA analysis logic 143.

At 655, the randomness score is compared with a predetermined randomness score threshold. Depending on the result of this comparison, at 660 the domain name extracted from the network traffic associated with network connection 160 is classified as not being DGA generated, or at 665 as being DGA generated. In other words, if DGA analysis logic 143 determines that the randomness score calculated at 650 is beyond the predetermined randomness score threshold, the domain name extracted from network traffic associated with network connection 160 is classified as being DGA generated, and therefore, at 665, network connection 160 is classified as being malicious.

The predetermined randomness score threshold may be adjusted or optimized based on a false positive rate or a false negative rate of the classification result.

Figure 7:
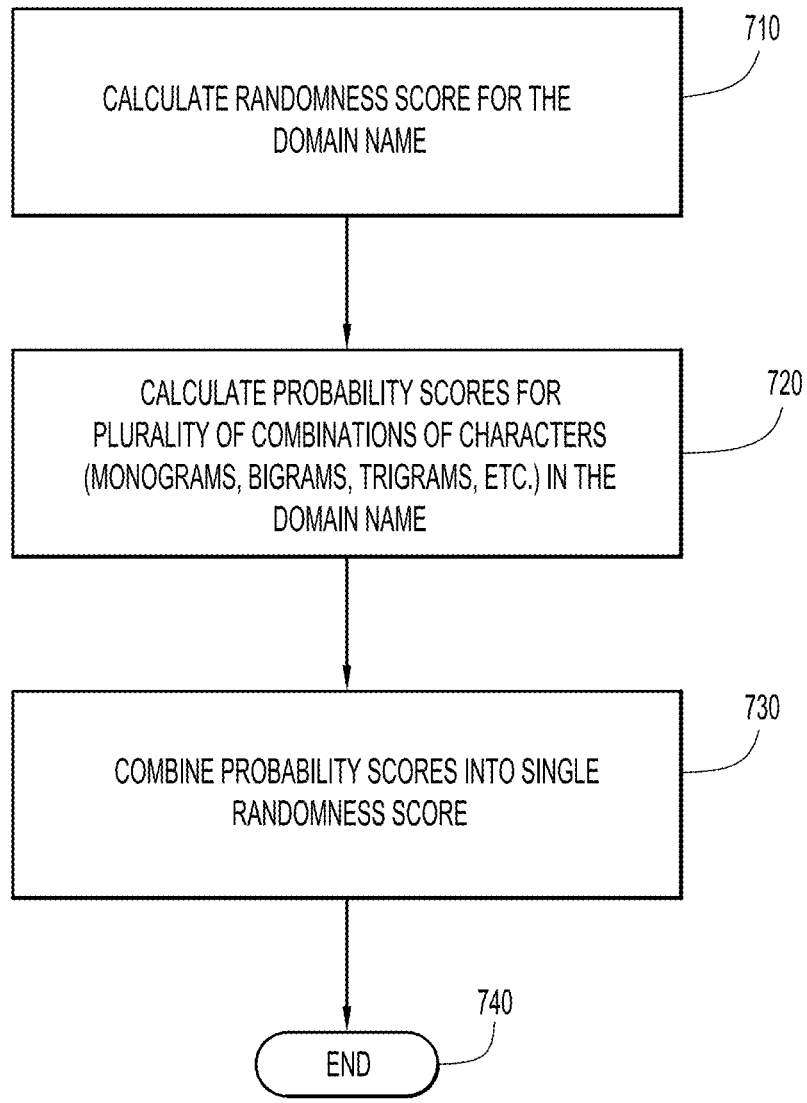
FIG. 7 is a flow chart depicting operations performed by the server to calculate a randomness score value for a primary registered domain name according to an example embodiment.

Reference is now made to FIG. 7 which illustrates a flow chart for method 700 depicting a process of calculating a randomness score for a primary registered domain name (step 650 in FIG. 6).

Since DGA generated domain names have a frequency distribution of characters that is different from a frequency distribution of characters in a legitimate domain name, the frequency distribution of characters may be utilized to calculate a randomness score, and the domain may be classified as being DGA generated if the randomness score is above (beyond) a certain threshold. To calculate the randomness score value, a set of monogram, bigram, trigram, quadgram, etc. is computed for the domain name to be analyzed. For example, the registered domain "cisco" would have monograms [c, i, s, c, o], bigrams [ci, is, sc, co], trigrams [cis, isc, sco], and quadgrams [cisc, isco].

Some sample occurrence probabilities for the English language are: p(t) 0.064, p(e) 0.106, p(te) 0.0106, p(er) 0.0177, p(ter) 0.00317, p(ere) 0.00097, p(tere) 0.00011073, and p(erer) 0.00002517. For example, in legitimate domain names, such as "cisco" or "google," the probability that the combination of characters forming these legitimate domain names are found in English language is relatively high. Other sets of characters, such as sets of characters of DGA generated domain names may have probabilities of occurrence in natural language that are relatively low. If the aggregated probability of the occurrence in a natural language of the set of characters used to form the domain name is very low, the probability that the domain name is DGA generated is very high.

An example algorithm, in which for each of the monograms, bigrams, trigrams, and quadgrams (summarized as *grams) of a domain name, a score is individually computed and in which "random_score" represents the random score, may include a sequence depicted below. This algorithm is derived from Claude Shannon's definition of entropy.

(a) score=0
(b) for each *gram g {score=score+p(g)*log (p(g))}
(c) score=−1*score/(length−*gram+1) ** constant a, where *gram is a size of the current gram being analyzed: unigram=1, bigram=2, etc.
(d) combine scores for each *gram based on the following formula: random_score=(monogram_score*constant b+bigram_score*constant c+trigram_score*constant d+quadgram_score*constant e)*constant f.
(e) classify domain name as random (or DGA generated) if random_score is less than a certain threshold.

In the above-described example algorithm, "constant a" to "constant f" may take any value of an integer. Values for "constant a" to "constant f" may be optimized for best performance of the algorithm.

Returning now to FIG. 7. Method 700 begins at 710 and is performed to calculate a randomness score for a primary registered domain, i.e., a domain one level below the top level domain (TLD).

At 720, a plurality of probability scores for a plurality of combinations of characters (monograms, bigrams, trigrams, etc.) used in the primary registered domain name are calculated. The probability scores may be calculated, for example, based on the above described example algorithm. However, method 700 is not limited to this example algorithm, and any other algorithm that looks at combinations of characters in the domain name and calculates probability values for each of the plurality of combinations of characters may also be used.

At 730, the plurality of calculated probability scores are combined into a single randomness score. More specifically, each of the single randomness scores may be weighted by factors, such as "constant b" to "constant e" in the above example algorithm. After summing up the weighted single randomness scores, the result may also be weighted by a factor such as "constant f" in the above example algorithm. Method 700 ends at 740.

Figure 8:
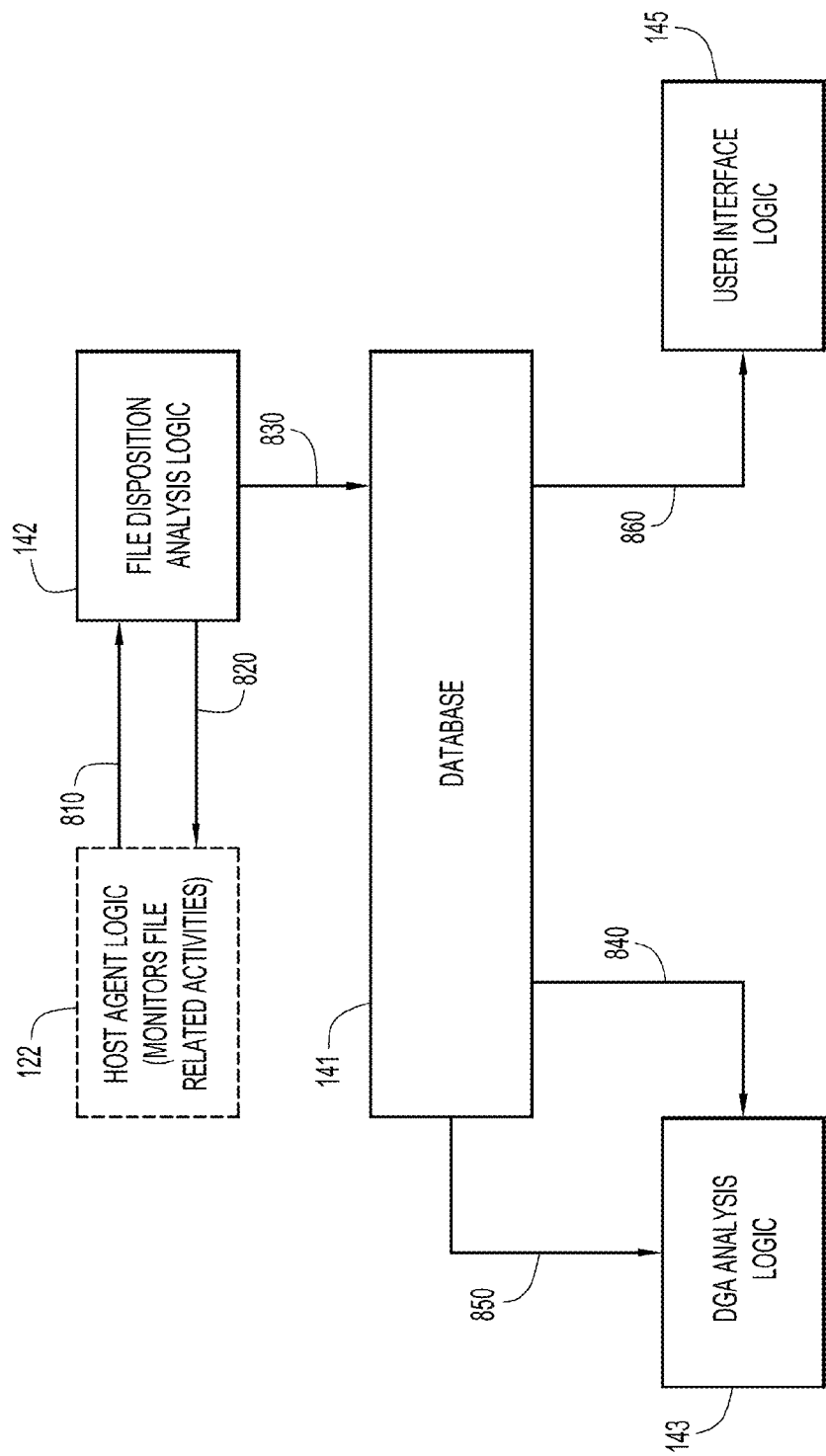
FIG. 8 is a block diagram illustrating flow of information according to an example embodiment.

Reference is now made to FIG. 8. FIG. 8 shows the flow of information between the entities that are described with regard to FIGS. 1-7 and that are configured to execute the techniques presented herein. As described above in connection with FIG. 2, host agent logic 122, which is executed on host computer 110, monitors file related activities on host computer 110 and sends queries, such as query 810, to file disposition analysis logic 142 executed on server 120. Query 810 contains information about executable file 123 executed on host computer 110 and about network connection 160. The information about executable file 123 may include a file name, a file size, and a hash value of executable file 123. Information about network connection 160 may include a URL to which executable file 123 tries to connect. When it is determined at 520 in method 500 shown in FIG. 5 that executable file 123 is "safe," or when it is determined at 530 in method 500 shown in FIG. 5 that executable file 123 is "malicious," file disposition analysis logic 142 returns disposition information 820 back to host agent logic 122 to indicate that executable file 123 is "safe" or to instruct host agent logic 122 to block the execution of executable file 123.

File disposition analysis logic 142 logs the entire transaction with host agent logic 122 to database 141. Transaction information 830 includes information contained in queries 810 and information contained in disposition information 820, received from and sent to host agent logic 122. The accumulated transaction information that is stored in database 141 is accessed by DGA analysis logic 143 by retrieving log entries 840 that contain the URLs to be analyzed. After classifying the URLs using the n-gram entropy based algorithm discussed above in conjunction with FIG. 7, DGA logic 143 stores the classification results 850 in database 141. Final DGA classifications 860 are forwarded to user interface logic 145 to inform a user about the classification results.

In summary, the above-described techniques are useful for the detection of a DGA domain name that is used to contact a C&C server during an early stage of a botnet infection sequence. The efficiency of discovering botnets, or attempts to establish botnets, is significantly improved and false positive classifications of network connections are significantly reduced by combining a host-based analysis of an executable file on a host computer with a network-based analysis, i.e., an analysis of a network connection initiated by the executable file. While the host-based analysis includes a determination of a disposition of the executable file to be malicious, the network-based analysis determines whether the network connection initiated by the executable file is malicious.

When information about an executable file that, when executed on a host computer, initiates a network connection, and information about the network connection is received, the information about the executable file is analyzed to determine whether the executable file has a malicious disposition. Depending on a disposition of the executable file, the information about the network connection is also analyzed to determine whether the network connection is malicious. The information about the executable file is analyzed by classifying the executable file as being safe, malicious or unknown.

When it is determined that the executable file is classified as being unknown, an analysis of the information about the network connection is performed. The information about the network connection is derived from network traffic associated with the network connection, such as a uniform resource locator that includes a domain name.

When the information about the network connection is analyzed, a domain name from the network traffic associated with the network connection is extracted, and a disposition of the domain name to be malicious is determined.

When it is determined that a length of the domain name is beyond (e.g., above) a predetermined threshold value, a randomness score for the domain name is calculated. When it is determined that the randomness score is beyond a predetermined randomness threshold, the network connection is classified as being malicious. The calculation of the randomness score may include calculating a frequency distribution of characters in the domain name by calculating probability scores for each of a plurality of combinations of characters in the domain name, and each of the plurality of the combinations comprises a different number of characters. The probability scores are then combined to generate the randomness score based on which it is determined whether the domain name is generated by a domain generation algorithm.

When it is determined that the domain name is generated by a domain generation algorithm, the network connection is classified as being malicious based on the determination that the executable file has the disposition to be malicious and the determination that the domain name is generated by the domain generation algorithm. The classification information about the network connection may be forwarded to a user interface.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   receiving information about an executable file residing on a host computer that, when executed on the host computer, initiates a network connection;
   receiving information about the network connection, including a domain name included in network traffic associated with the network connection;
   analyzing the information about the executable file to determine whether the executable file has an unknown disposition;
   upon determining that the executable file has the unknown disposition, analyzing the information about the network connection to determine whether the network connection is malicious based on whether the domain name is generated by a domain generation algorithm; and
   classifying the network connection as being malicious when it is determined that the domain name is generated by the domain generation algorithm.

2. The method of claim 1, wherein the information about the executable file includes at least one of a file name, a file size, and a hash value and analyzing the information about the executable file comprises:
   classifying the executable file as being safe, malicious or unknown.

3. The method of claim 1, further comprising:
   forwarding classification information about the network connection to a user interface.

4. The method of claim 1, wherein determining that the domain name is generated by a domain name generation algorithm includes:
   extracting the domain name from the network traffic associated with the network connection;
   upon determining that a length of domain name is beyond a predetermined threshold value, calculating a randomness score for the domain name; and
   upon determining that the randomness score is beyond a predetermined randomness threshold, classifying the network connection as being malicious.

5. The method of claim 4, wherein calculating the randomness score includes:
   calculating a frequency distribution of characters in the domain name by calculating probability scores for each of a plurality of combinations of characters in the domain name, wherein each of the plurality of the combinations comprises a different number of characters; and
   combining the probability scores to generate the randomness score.

6. The method of claim 1, further comprising:
   comparing the domain name with entries in a database; and
   classifying the domain name as being safe upon determining that the domain name is in the database.

7. One or more non-transitory computer readable storage media encoded with software comprising executable instructions and when the software is executed operable to:
   receive information about an executable file residing on a host computer, that when executed on the host computer, initiates a network connection;

receive information about the network connection, including a domain name included in network traffic associated with the network connection;

analyze the information about the executable file to determine whether the executable file has an unknown disposition;

upon determining that the executable file has the unknown disposition, analyze the information about the network connection to determine whether the network connection is malicious based on whether the domain name is generated by a domain generation algorithm; and classify the network connection as being malicious when it is determined that the domain name is generated by the domain generation algorithm.

8. The computer readable storage media of claim 7, wherein the information about the executable file includes at least one of a file name, a file size, and a hash value and the instructions operable to analyze the information about the executable file comprise instructions operable to:

classify the executable file as being safe, malicious or unknown.

9. The computer readable storage media of claim 7, further comprising instructions operable to:

forward classification information about the network connection to a user interface.

10. The computer readable storage media of claim 7, wherein the instructions to determine that the domain is generated by a domain generation algorithm include instructions operable to:

extract the domain name from the network traffic associated with the network connection;

upon determination that a length of the domain name is beyond a predetermined threshold, calculate a randomness score for the domain name; and upon determination that the randomness score is beyond a predetermined randomness threshold, classify the network connection as being malicious.

11. The computer readable storage media of claim 10, wherein the instructions operable to calculate the randomness score include instructions operable to:

calculate a frequency distribution of characters in the domain name by calculating probability scores for each of a plurality of combinations of characters in the domain name, wherein each of the plurality of the combinations comprises a different number of characters; and combine the probability scores to generate the randomness score.

12. The computer readable storage media of claim 7, further comprising instructions operable to:

compare the domain name with entries in a database; and
classify the domain name as being safe upon determining that the domain name is in the database.

13. An apparatus comprising:

one or more network interface devices that enable network communication;
a memory; and
a processor coupled to the one or more network interface devices and to the memory, wherein the processor is configured to:

receive information about an executable file residing on a host computer that, when executed on the host computer initiates a network connection;

receive information about the network connection, including a domain name included in network traffic associated with the network connection;

analyze the information about the executable file to determine whether the executable file has an unknown disposition;

upon determining that the executable file has the unknown disposition, analyze the information about the network connection to determine whether the network connection is malicious based on whether the domain name is generated by a domain generation algorithm; and classify the network connection as being malicious when it is determined that the domain name is generated by the domain generation algorithm.

14. The apparatus of claim 13, wherein the information about the executable file includes at least one of a file name, a file size, and a hash value and the processor is further configured to:

classify the executable file as being safe, malicious or unknown.

15. The apparatus of claim 13, wherein the processor is configured to:

forward classification information about the network connection to a user interface.

16. The apparatus of claim 13, wherein the processor is configured to determine that the domain name is generated by a domain name generation algorithm by:

extracting the domain name from the network traffic associated with the network connection;

upon determining that a length of the domain name is beyond a predetermined threshold value, calculate a randomness score for the domain name; and upon determining that the randomness score is beyond a predetermined randomness threshold, classify the network connection as being malicious.

17. The apparatus of claim 16, wherein when the processor is configured to calculate the randomness score value by:

calculating a frequency distribution of characters in the domain name by calculating probability scores for each of a plurality of combinations of characters in the domain name, wherein each of the plurality of the combinations comprises a different number of characters; and combining the probability scores to generate the randomness score.

18. The apparatus of claim 13, wherein the processor is further configured to:

compare the domain name with entries in a database; and
classify the domain name as being safe upon determining that the domain name is in the database.

* * * * *